(12) United States Patent
Blessing et al.

(10) Patent No.: US 7,513,239 B2
(45) Date of Patent: Apr. 7, 2009

(54) COMPRESSION IGNITION INTERNAL COMBUSTION ENGINE

(75) Inventors: Matthias Blessing, Berglen (DE); Harald Braun, Esslingen (DE); Frank Keller, Ostfildern (DE); Gerhard Koenig, Lauterstein (DE); Christian Krueger, Stuttgart (DE); Alois Raab, Boebingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/563,334

(22) PCT Filed: Jun. 25, 2004

(86) PCT No.: PCT/EP2004/006882

§ 371 (c)(1),
(2), (4) Date: Sep. 7, 2007

(87) PCT Pub. No.: WO2005/001267

PCT Pub. Date: Jan. 6, 2005

(65) Prior Publication Data

US 2008/0135014 A1 Jun. 12, 2008

(30) Foreign Application Priority Data

Jun. 30, 2003 (DE) .............................. 103 29 506

(51) Int. Cl.
*F02B 3/00* (2006.01)
*F02B 5/00* (2006.01)

(52) U.S. Cl. ....................................... 123/299; 123/305

(58) Field of Classification Search .................. 123/299, 123/300, 304, 305, 295, 430; 701/104, 105
See application file for complete search history.

(56) References Cited

U.S. PATENT DOCUMENTS

| | | | | |
|---|---|---|---|---|
| 6,491,016 B1 * | 12/2002 | Buratti | .................. | 123/299 |
| 6,513,487 B1 * | 2/2003 | Jorach et al. | .................. | 123/299 |
| 6,536,209 B2 | 3/2003 | Fluga et al. | | |
| 6,901,747 B2 * | 6/2005 | Tashiro et al. | .................. | 60/286 |
| 2003/0066509 A1 * | 4/2003 | Shafer et al. | .................. | 123/305 |
| 2004/0103874 A1 * | 6/2004 | Takahashi | .................. | 123/299 |
| 2004/0177829 A1 * | 9/2004 | Sieber et al. | .................. | 123/299 |
| 2004/0237929 A1 * | 12/2004 | Cavanagh et al. | .................. | 123/299 |

FOREIGN PATENT DOCUMENTS

| | | |
|---|---|---|
| DE | 100 20 148 A1 | 11/2000 |
| DE | 199 53 932 A1 | 5/2001 |
| DE | 102 07 189 A1 | 9/2002 |
| DE | 101 59 479 A1 | 6/2003 |
| EP | 1 035 315 A2 | 3/2000 |

* cited by examiner

*Primary Examiner*—Mahmoud Gimie
(74) *Attorney, Agent, or Firm*—Crowell & Moring LLP (57) ABSTRACT

A method for operating an internal combustion engine, injects fuel directly into a combustion chamber as a main injection, a postinjection and optionally also as a preinjection. An injection nozzle with a plurality of injection bores effects the preinjection and the postinjection preferably which is carried out cyclically. To minimize wetting of the combustion chamber walls, during the postinjection the partial quantities of fuel and a lift of the nozzle needle of the injection nozzle are set so that, for each partial quantity of the postinjection injected into the combustion chamber, the reach of the respective fuel jet in the combustion chamber is limited and the reach is less than the distance to a combustion chamber boundary.

16 Claims, 4 Drawing Sheets

COMPRESSION IGNITION INTERNAL COMBUSTION ENGINE

BACKGROUND AND SUMMARY OF THE INVENTION

The present invention relates to a method for operating an internal combustion engine, in particular a diesel internal combustion engine, and to an injection apparatus therefore.

When operating internal combustion engines with direct injection, attempts have been made in the past to influence the combustion and the formation of emissions by varying the injection profile. In the case of direct-injection internal combustion engines with compression ignition, injection valves in which the configuration of the injection profile is controlled by a suitable structure and targeted opening of the injection valve are used to configure a load-dependent fuel injection. This is also intended to improve and optimize the functioning of a downstream exhaust-gas aftertreatment. By way of example, a targeted injection profile shaping can be used to provide a substoichiometric exhaust gas for desulfurizing NOx storage catalytic converters and for the on-board generation of $NH_3$.

DE10159479.8-13, a patent application which was not published before the priority date of the present patent, has disclosed a method in which fuel is introduced into a combustion chamber as a main injection and a postinjection, it being possible for the two injections to be carried out cyclically. In this case, the intention is to influence the time profile of the combustion, so that a time sequence of the torque profile and/or a pressure profile in the cylinder of the internal combustion engine are altered in order to influence the exhaust gas composition and an exhaust gas temperature.

DE 19953932 A1 has disclosed a method in which a proposed combined homogeneous/heterogeneous operating mode of an internal combustion engine is intended to achieve medium and relatively high powers. In this case, both an early homogeneous mix formation in the compression stroke and a subsequent heterogeneous mix formation around the top dead center are supposed to be possible using one injection strategy, with the fuel injection for the homogeneous mix formation taking place at a lower injection pressure than for the heterogeneous mix formation, in order to avoid fuel being applied to the cold combustion chamber walls. Nevertheless, it has been found that despite the measures proposed above, high exhaust emissions continue to occur. Consequently, further measures have to be taken to minimize the exhaust emissions.

An object of the present invention is to provide a method for an internal combustion engine with compression ignition which reduces the exhaust emissions. According to the invention, this is achieved by a cyclically injected postinjection in partial quantities such that the partial fuel quantities are formed in different magnitudes.

A further object of the invention is to provide an apparatus which improves the exhaust gas properties and consumption properties of a compression-ignition internal combustion engine. According to the invention, this object is achieved by an apparatus having a spray hole cone angle of from 80° to 140° set between the injected fuel jets.

According to the method of the invention, fuel is injected directly into a combustion chamber of an internal combustion engine in the form of a plurality of fuel jets by an injection nozzle which has a nozzle needle and injection bores. A fuel quantity is injected at a later time following the main injection as a cyclical postinjection, the postinjection being injected cyclically in partial quantities, so that the partial quantities of fuel of the postinjection are formed in different magnitudes. As a result, it is possible to adapt the partial quantity of fuel in a targeted way to the piston position in the cylinder and/or an operating point of the internal combustion engine, with the respective partial quantity being mixed with the combustion chamber air in good time before it reaches the cylinder wall. As a result wetting of the cylinder wall with fuel is substantially avoided.

According to one configuration of the invention, during the cyclical postinjection, a lift of the nozzle needle of the injection nozzle and/or a fuel injection pressure are set so that for each partial quantity of the postinjection injected into the combustion chamber the reach of the respective fuel jet in the combustion chamber is limited and thereby the reach is less than the distance to a combustion chamber boundary. As a result, fuel accumulation on the walls of the cylinder, which rises constantly for example with a lower gas pressure and lower temperature in the cylinder, is minimized.

According to the invention, increased breaking-up and vaporization of the injection jet is achieved. The cyclical postinjection provided according to the invention leads to a shortening of the liquid jet length. This represents the length or penetration depth of an injection jet formed from liquid fuel. Therefore, application of fuel to the cold combustion chamber walls is avoided, because this fuel fraction mostly reacts with the residual air and residual gas in the cylinder, and therefore does not enter the engine oil, as is the case with increased introduction of fuel.

According to yet a further configuration of the invention, a first partial quantity of fuel of the postinjection is made to be greater than a subsequent quantity of fuel of the postinjection. This counteracts locally intensive enriching of the mix formed in the combustion chamber, in particular during the cyclical postinjection, so that the formation of particulates is minimized or prevented in particular during the postinjection. It is expedient for the individual injection quantities during the postinjection to be configured such that in each case a certain quantity of fuel enters the combustion chamber and is intensively and completely mixed with the combustion chamber air before the fuel jet has reached the combustion chamber boundary or a cylinder wall.

According to still a further configuration of the invention, the postinjection is injected into the combustion chamber at a lower injection pressure than that of the main injection. It is in this way possible to avoid further application of fuel to the walls, since a combustion chamber back pressure changes to a decreasing extent with a change in piston position during the postinjection. Furthermore, the pressure of the injected fuel during the cyclical postinjection can be varied or continuously adapted, preferably as a function of the piston position, or reduced to a lower level than during the main injection, in order to counteract the falling combustion chamber pressure during an expansion stroke of the internal combustion engine. As a result, by way of example. The depth of penetration of the partial quantities of fuel in the form of injection jets in the combustion chamber can be kept constant during the cyclical postinjection.

According to a further configuration of the invention, a lift of the nozzle needle of the injection nozzle is set so that a non-steady-state, cavitational flow is generated in the injection bores of the injection nozzle. The drops of fuel within the injected jet shortly after the jet leaves the injection nozzle and to be atomized in good time. This feature substantially minimizes the extent to which the fuel strikes, for example, the cylinder wall serving as a combustion chamber boundary.

According to the present invention, the cyclical nature of the postinjection is such that the reach of the fuel jet in the combustion chamber is limited for each partial quantity injected. As a result, the reach is substantially limited approximately to less than the distance to a cylinder wall by boosting the extent to which the fuel jets injected break down in the combustion chamber. During the postinjection, the individual injection cycles are configured in such a manner that in each case the jet momenta of the individual injections are adapted, and at the respective combustion chamber gas density the reach of the fuel jets approximately amounts to the distance to the combustion chamber cylinder wall or the piston base.

Control of an injection jet momentum and of an injection partial quantity is preferably effected by the pulse duration or the cycle time in combination with a targeted configuration of the injection nozzle needle, so that the fuel jets, as a result of increased atomization, break down shortly after they have emerged from the injection nozzle. The formation of particulates and significant application of fuel to the cylinder wall are substantially avoided or minimized.

Further criteria for the configuration of an additional postinjection can ensue from the demands of any exhaust-gas aftertreatment measure.

To carry out the method according to the invention, an inwardly opening nozzle needle with a plurality of injection bores is provided, in which the fuel is injected into the combustion chamber in the form of fuel jets through the injection bores, so that a spray hole cone angle of from 80° to 140° or from 80° to 160° can be set between the injected fuel jets.

According to one configuration of the method according to the invention, the lift of the nozzle needle in an opening direction is adjustable. Thus, during the cyclical postinjection the lift of the nozzle needle can be set variably. The setting of the lift can optionally take place in a load-dependent manner. As a result, an injection partial quantity which has been implemented during the cyclical postinjection is varied. Furthermore, a non-steady-state cavitational flow can be formed in the injection bores of the injection nozzle by the adjustment of the lift.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

DETAILED DESCRIPTION OF THE DRAWINGS

Figure 1:
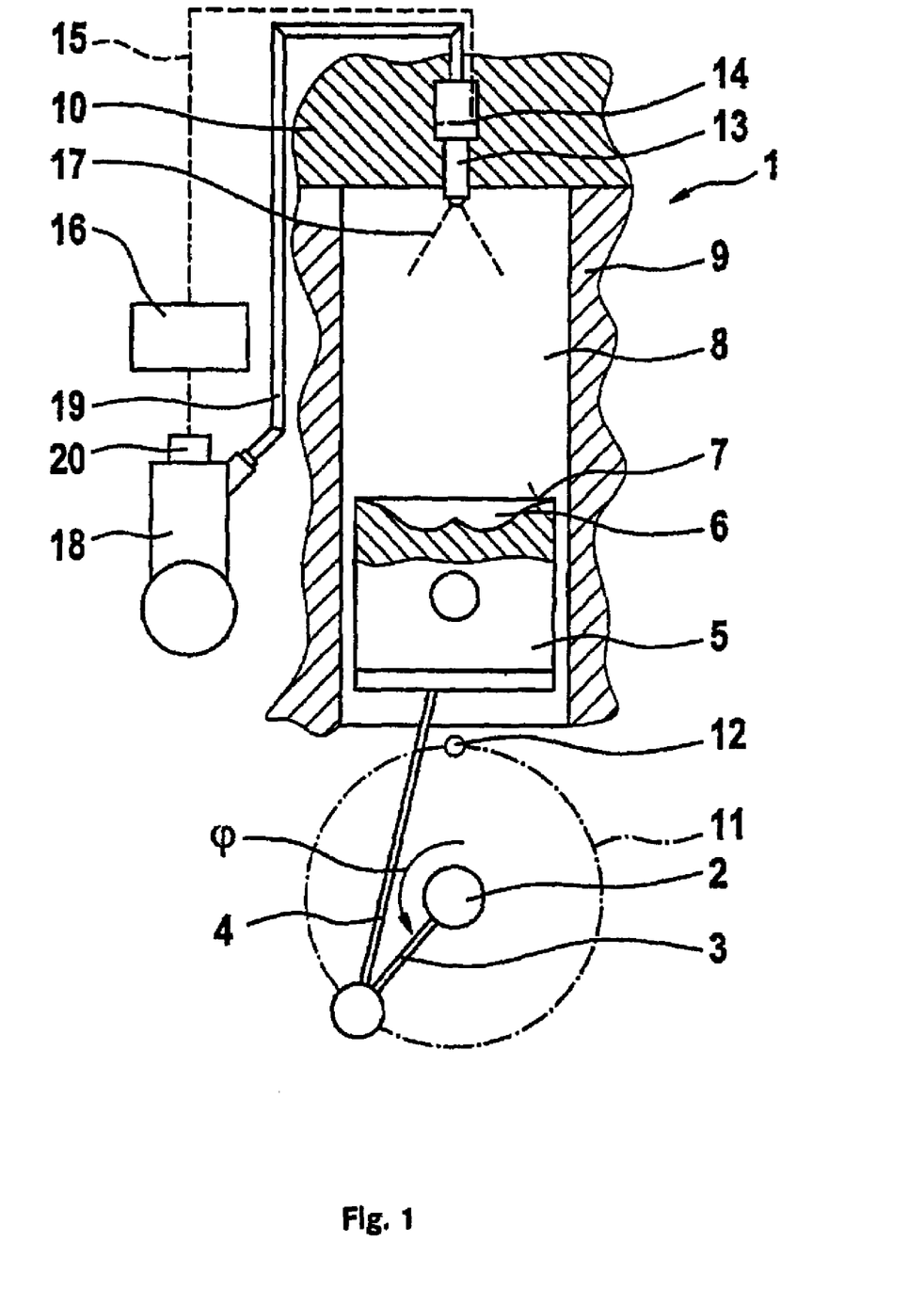
FIG. 1 is a schematic, cross section view through an internal combustion engine with compression ignition.

FIG. 1 shows an internal combustion engine 1 in which a crankshaft 2 is driven by a piston 5, which is guided in a cylinder 9, via a connecting rod 4. A combustion chamber 8, which comprises a piston hollow 6 recessed in the piston base 7, is formed in the cylinder 9 between the piston 5 and a cylinder head 10.

As a crank 3 of the crankshaft 2 rotates clockwise on a crank circle 11, the size of the combustion chamber 8 decreases, with the air enclosed in it being compressed. The charge exchange in the combustion chamber 8 takes place via gas exchange valves and gas passages (not shown) in the cylinder head 10.

The end of the compression is reached once a top dead center 12 of the crank 3, referred to below as TDC, is reached. The current position of the piston 5 with respect to the cylinder head 10 is determined by the crank angle $\phi$ with respect to top dead center 12.

An injection nozzle 13 with a plurality of injection bores is arranged centrally in the cylinder head 10. The injection bores are each inclined at an angle of from 40° to 80° with respect to the nozzle axis. The spray hole cone angle is approx. 80° to 160°. This may in principle be a conventional and therefore inexpensive perforated nozzle of the seat hole, mini-blind hole or blind hole type. The injection nozzle 13 is actuated via a signal line 15 and an actuator 14, for example a piezo-actuator, by an electronic control unit 16, the engine control unit. The injection jets which emerge from the injection nozzle are denoted by 17.

The fuel is made available in a plurality of pressure stages by an injection pump 18, with a control valve 20, expediently an electronically actuable solenoid valve, limiting the respective maximum pressure in the fuel line 19. It is preferable for the injection pressure to be adapted by a suitable injection system. It is in this context possible to use an injection system with needle lift control and with suitable pressure modulation.

According to the invention, the injection nozzle 13 has from four to fourteen injection bores, which are preferably distributed in one or two rows of holes over the circumference. Operation of the internal combustion engine 1 can be optimized by the optional use of an injection nozzle with two differently actuable rows of holes, for example by an inwardly opening coaxial variable nozzle. Preferably, one of the two rows of holes may be actuated at a spray hole cone angle $\alpha$, preferably of between 130° and 160°, to represent conventional lean-burn operation, in which case the second row of holes is used with a significantly smaller spray hole cone angle, preferably between 80° and 140°, in particular for implementing rich-burn mode with a postinjection and if appropriate for a preinjection. The actuation of the row of holes with the smaller spray hole cone angle $\alpha$, e.g. 80° instead of 150°, extends the free jet length in the event of a late postinjection, for example at 70° CA to 90° CA after TDC. Therefore, the fuel jet 17 does not strike the cylinder wall, but rather is directed in the direction of the piston hollow 6 or onto the piston base 7.

Figure 6:
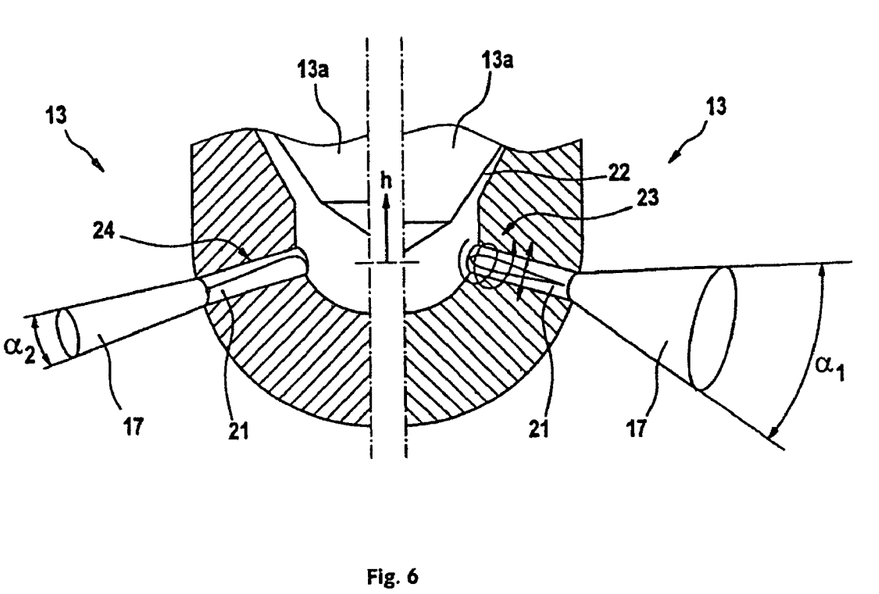
FIG. 6 is a schematic, partial, cross-sectional view which depicts the effect of a non-steady-state cavitational flow in the nozzle hole of a multihole nozzle.

The injection nozzle 13 has a nozzle needle 13a which is illustrated in FIG. 6 and is connected to a control element (not shown). Actuation of the nozzle needle 13a by the control element causes the needle to be moved in order to open or close the injection nozzle 13. In the process, a defined operating lift h during an operating position is set as a function of the operating point and/or as a function of the crank angle φ. A throughflow of fuel can then be determined or altered as a function of the operating lift h and an opening time or a cycle duration and as a function of the fuel injection pressure set.

The present method is suitable in particular for a combined homogeneous/heterogeneous combustion method with compression ignition, so that a conventional lean-burn mode, which is known from diesel engines, and a rich-burn mode for optimizing a downstream exhaust-gas aftertreatment system, which is configured in particular for lean-burn internal combustion engines, can be carried out.

The internal combustion engine 1 also has an exhaust-gas purification system (not shown) comprising, for example, a plurality of catalytic converter units. The compression-ignition internal combustion engine 1 is usually run mainly in a lean-burn mode and, if necessary, switched to a rich-burn mode in order to optimize the downstream exhaust-gas purification system. The term lean-burn mode denotes a superstoichiometric engine operating mode, in which an excess of oxygen, i.e. $\lambda > 1$, is used in the combustion. Rich-burn mode is to be understood as meaning a substoichiometric engine operating mode in which an excess of fuel, i.e. $\lambda[<] \leqq 1$, is used in the combustion. Accordingly, a lean exhaust-gas composition denotes an excess of oxygen in the exhaust gas, and a rich exhaust-gas composition denotes a deficit of oxygen in the exhaust gas.

With a rich exhaust-gas composition, ammonia can be generated from suitable exhaust-gas constituents by a first catalytic converter unit. A second catalytic converter unit, which adsorbs ammonia generated by the first catalytic converter unit when the exhaust-gas composition is rich, releases the ammonia again when the exhaust-gas composition is lean. This ammonia then serves as a reducing agent for a reduction reaction, by which nitrogen oxides contained in the exhaust gas are converted into nitrogen with simultaneous oxidation of the ammonia. As soon as the temporarily stored quantity of ammonia has been exhausted in lean-burn mode, the engine is switched to rich-burn mode. For NOx regeneration and the desulfurizing of NOx storage catalytic converters and for the on-board generation of $NH_3$ for the regeneration of an SCR catalytic converter, it is necessary for a substoichiometric exhaust gas to be generated at the engine and made available to the catalytic converters, e.g. the NOx storage catalytic converter and/or the SCR catalytic converter.

When the internal combustion engine 1 is operating, measures are taken to avoid the accumulation of liquid fuel in connection with a postinjection PI which is provided after a main injection MI or with a preinjection PRI provided before the main injection MI, so that early mixing with the combustion air in the combustion chamber takes place. These measures may be taken individually or in combination with one another, so that any conceivable combination of these measures can be selected as desired.

Both in lean-burn mode and in rich-burn mode of the internal combustion engine 1, the quantity of fuel to be introduced can be introduced into the combustion chamber as a preinjection quantity, a main injection quantity and a postinjection quantity by being divided appropriately according to the operating point. The present invention serves primarily to optimize the different fuel quantities and the way in which they are adapted as a function of operating point, so as to avoid an accumulation of fuel on the combustion chamber walls.

In the present internal combustion engine, the generation of a substoichiometric exhaust gas is achieved by the postinjection. Thereby, the fuel quantity which is introduced late at least partially does not participate in the combustion. In principle, a number of measures are suitable for forming a substoichiometric exhaust gas. This may, for example, also be achieved by throttling the engine on the air and exhaust-gas side or increasing the exhaust-gas recirculation rate and increasing the fuel quantity in the cylinder or in the exhaust section, in a manner which is load-neutral. The measure relating to fuel by way of a suitable postinjection offers significant advantages over the throttling of the engine and the increasing of the exhaust-gas recirculation rate in terms of the ability to realize rich-burn mode quickly. For example, the partial quantities formed by a postinjection carried out cyclically can be quantitatively altered from combustion cycle to combustion cycle. The engine-internal introduction of fuel offers advantages over the post-engine metering of fuel in particular with regard to the precision or required accuracy in forming the exhaust-gas constituents which are required for the exhaust-gas aftertreatment system, namely CO, $H_2$ for an adsorber catalytic converter and $NH_3$ for an SCR catalytic converter, at relatively low cost.

Figure 2:
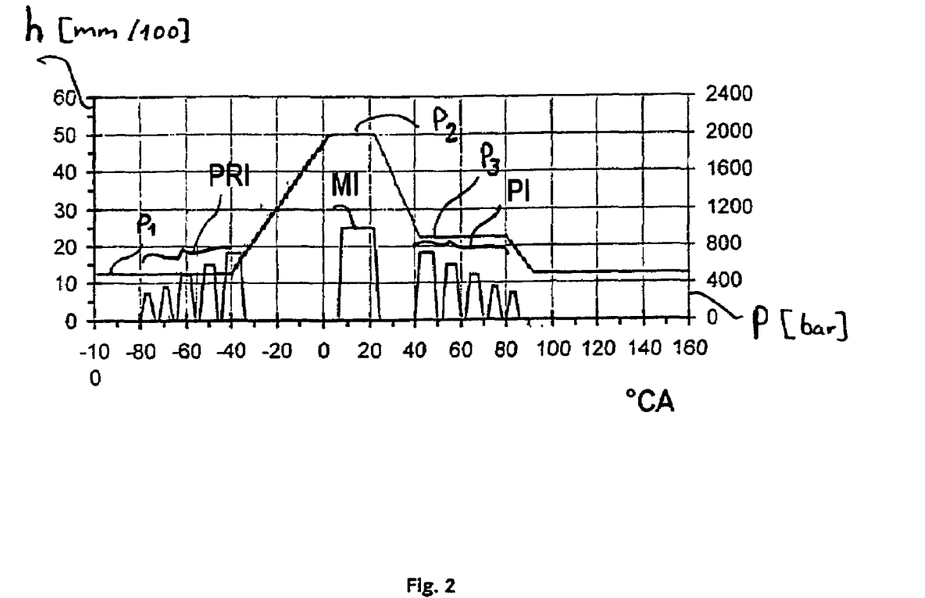
FIG. 2 is a diagram plotting the profile of a fuel injection with a 5-cycle preinjection, a main injection and a 5-cycle postinjection.

The injection strategy presented in FIG. 2 provides for a preinjection, a main injection and a postinjection. The preinjection PRI takes place as a homogenizing injection in a range between 140° CA and 40° CA before TDC. In this case, the preinjection PRI takes place at an injection pressure $P_1$ as a cyclical injection of fuel. The cycles are such that a different needle lift h is set for each cycle. The targeted cyclical nature of the preinjection PRI results in homogenization of the partial quantities injected. As an alternative to the cyclical preinjection, the homogenization in the compression stroke can also be achieved by cavitation effects being realized in the nozzle blind hole region and in the nozzle holes by constant positioning of the nozzle needle 13a of the injection nozzle 13, e.g. by direct actuation by way of a piezo-actuator.

The main injection then takes place at a higher injection pressure $P_2$ in a range between 10° CA before TDC and 20° CA after TDC. A greater needle lift h is set for the main injection MI than for the preinjection PRI. It is preferable for the main injection quantity MI to be introduced at an injection pressure P2 which is as high as possible and at an interval of from 5° CA to 15° CA with respect to the ignition point of the homogeneous combustion. The position of the main injection MI is limited by the maximum permissible peak pressure of the internal combustion engine and the maximum permissible pressure rise in the engine. To avoid an increase in torque as a result of the main injection MI in combination with the upstream preinjection PRI and the postinjection PI, the main injection quantity is correspondingly reduced such that the engine torque overall corresponds to the torque of a pure lean-burn mode.

The injection of an additional quantity of fuel in the form of the postinjection takes place, in particular during the rich-burn phase, by a 2-cycle to 8-cycle injection in the expansion stroke during a range from approx. 20° to 150° CA after TDC. The individual injection cycles for the injection are adapted in terms of duration, injection pressure, needle lift profile and interaction with the cylinder internal flow so as to achieve an optimum mix distribution, with no significant application of fuel to the cylinder wall. The needle opening duration during the individual cycles of the postinjection PI is set to be lower than the needle opening duration of the main injection MI.

The needle lift setting is set differently during the postinjection PI, preferably being set to successively decrease. In this case, during the postinjection with a variable needle lift, a constant fuel injection pressure is set, which is preferably higher than the pressure during the preinjection PRI and lower than the pressure during the main injection MI. It is preferable for the cycles during the postinjection to be carried out such that the first partial quantity of fuel of the postinjection is greater than the subsequent partial quantity of fuel.

Figure 3:
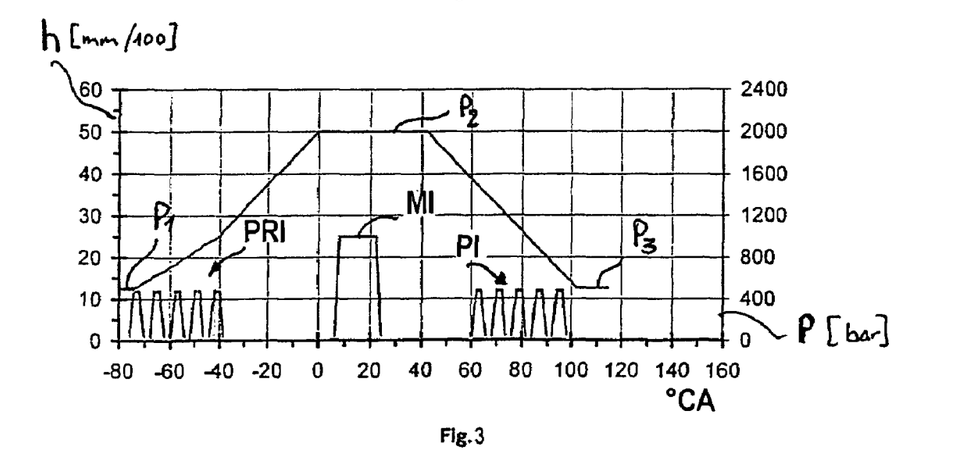
FIG. 3 is a diagram plotting the profile of a fuel injection with a 5-cycle preinjection with a constant cycle duration, a constant needle lift and a rising injection pressure during the preinjection, as well as a main injection and a 5-cycle postinjection with an injection pressure which drops while the cycle duration remains the same and the needle lift remains constant.

A second injection strategy is illustrated in FIG. 3, in which the internal combustion engine 1 is operated in a combined homogeneous/heterogeneous mode with 5-cycle preinjection PRI with a constant cycle duration and a rising injection pressure during the preinjection PRI, as well as a main injection MI with an increased injection pressure P2 and a needle lift h set to its maximum, and a 5-cycle postinjection PI with a constant cycle duration and a decreasing injection pressure. It is preferable for the cycles during the postinjection to be carried out so that the first partial quantity of fuel of the postinjection is greater than or equal to the subsequent partial quantity of fuel.

The cyclical preinjection PRI in accordance with FIG. 3 takes place in the compression stroke in a crank angle range from approximately 80° CA to approximately 35° CA before TDC. It takes place in such a manner that the injection pressure increases in each cycle. That is, the pressure for the partial injection quantity which takes place at an early stage during the preinjection PRI, for example in a common rail injection system, is lower than for the following partial injection quantity, with the needle lift h remaining constant during the cyclical preinjection PRI. The main injection then takes place at a higher injection pressure P2 in a range between top dead center and approximately 30° CA after TDC. During the main injection MI, a higher needle lift h is set than for the preinjection PRI, with the needle opening duration of the main injection MI being longer than the needle opening duration for the preinjection and the postinjection MI. During the postinjection, the needle lift h is kept at a constant value which is lower than that used for the main injection, while the injection pressure changes or decreases continuously. Different fuel pressure change rates are set during the preinjection and the postinjection, since different combustion reactions, which cause uneven combustion chamber pressure and/or temperature profiles, take place in the combustion chamber 8 both during the preinjection and during the postinjection.

Figure 4:
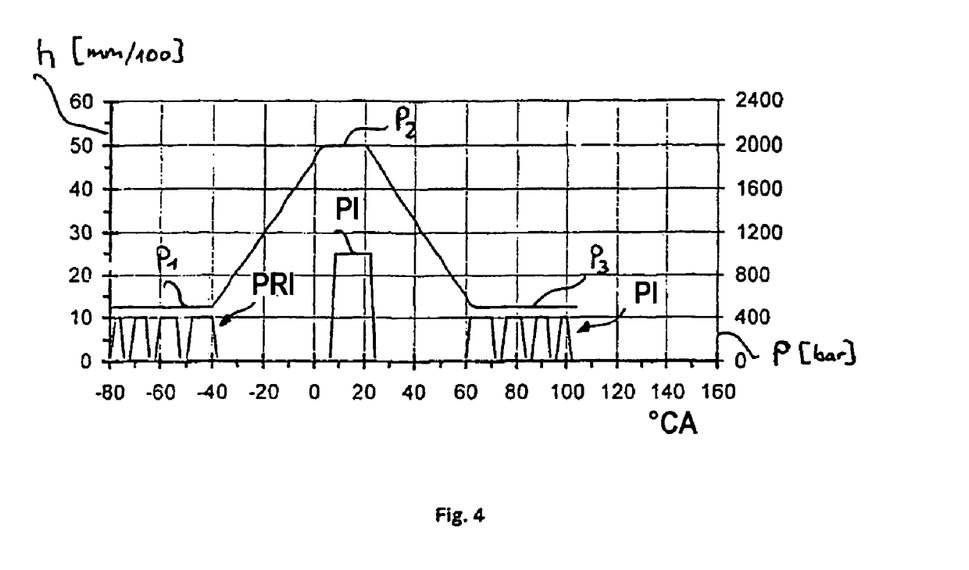
FIG. 4 is a diagram plotting the profile of a fuel injection with a 4-cycle preinjection with a cycle duration which increases and a constant injection pressure, as well as a main injection and a 4-cycle postinjection at a constant injection pressure and with a decreasing cycle duration.

The injection profile in accordance with FIG. 4 provides a particularly advantageous injection strategy. As shown, a combined homogeneous/heterogeneous mode is provided with a 4-cycle preinjection with the cycle duration increasing while the injection pressure remains constant with the nozzle needle 13a dwelling at a lower lift position. Furthermore, a main injection MI at an elevated injection pressure P2 and a needle lift h set to its maximum, and a postinjection PI with a decreasing cycle duration at a constant injection pressure P3 are provided. The cycles during the postinjection can preferably be carried out so that the first partial fuel quantity of the postinjection is greater than the subsequent partial fuel quantity.

Figure 5:
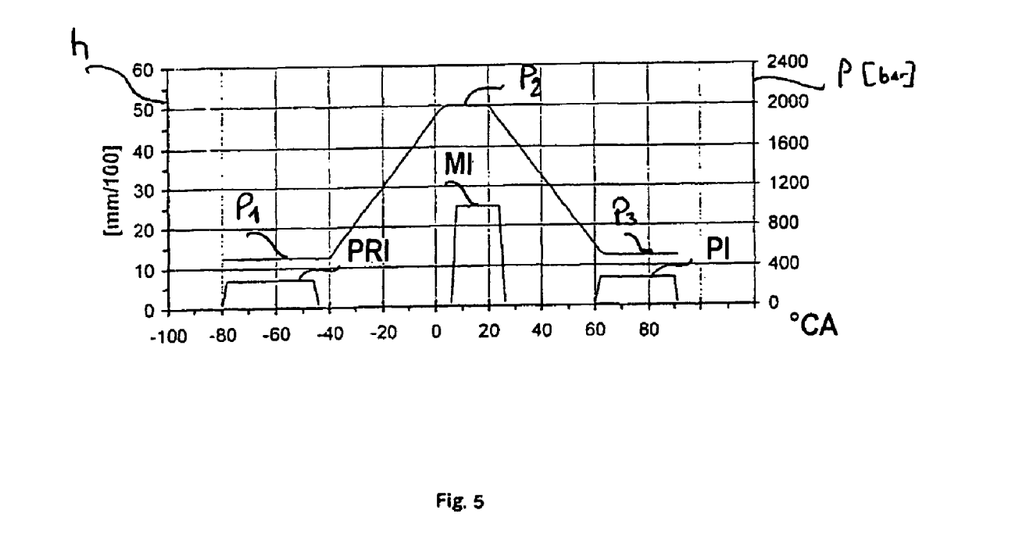
FIG. 5 is a diagram plotting the profile of a fuel injection with one block preinjection at a constant injection pressure, as well as a main injection and one block postinjection at a constant injection pressure.

The present injection system, during a divided or cyclical injection, allows different lift positions to be set and thus a different partial injection quantity can be implemented according to demand. Nevertheless, it is optionally possible for the cycles shown in FIG. 5 to be replaced by a block injection with a defined, limited lift position, e.g. with the aid of a piezo-actuator. This offers advantages over the cyclical form with regard to constancy of quantity and nozzle wear.

In the case of a purely conventional lean-burn mode without a postinjection, alternatively, the preinjection PRI is carried out in a range between 40° CA and top dead center TDC, with the start of the main injection MI preferably taking place in a range between 15° CA before TDC and 15° CA after TDC. Both can be actuated as a block injection in such a way as to achieve a high momentum of the injection jets. To satisfy the requirements for efficient lean-burn combustion, the injection pressure is in this case set to a maximum level.

The injection pressure $P_1$ during the preinjection and the injection pressure $P_3$ during the postinjection, in the abovementioned injection strategies in accordance with FIG. 2 to FIG. 5, are preferably selected in such a way that on account of the cyclical preinjection and postinjection the injected fuel accumulates to an insignificant extent on the combustion chamber boundary of the combustion chamber 8.

FIG. 6 diagrammatically depicts the injection nozzle 13 of the blind hole nozzle type; however, a nozzle of the seat hole nozzle type is equally suitable. The effect of a non-steady-state cavitational flow which is produced in a nozzle hole 21 of the injection nozzle 13 at a low needle lift h of the nozzle needle 13a, i.e. with the injection nozzle 13 partially open, and the resulting effect on a spreading angle $\alpha_1$ of the injection jet 17, are illustrated in the injection nozzle 13 shown in FIG. 6.

On the right-hand side of FIG. 6, the injection nozzle 13 is only partially open, resulting in throttling in the nozzle needle seat 22. This throttling produces a turbulent or non-steady-state cavitational flow in the nozzle hole 21, which leads to a large spreading angle $\alpha_1$ of the fuel jet 17. Compared to a completely open injection nozzle at its maximum lift setting, as illustrated on the left-hand side of FIG. 6, the spreading angle $\alpha_1$ brought about by the non-steady-state cavitational flow is larger than a spreading angle $\alpha_2$ which is produced without this form of flow. The non-steady-state cavitational flow causes considerable fluctuations in the nozzle internal flow 23, which when fuel emerges from the nozzle hole 21 lead to increased fuel jet breakdown and therefore to a large spreading angle $\alpha_1$.

The fuel jet with the spreading angle $\alpha_1$ spreads out with intensive atomization in the combustion chamber, and thereby effects better homogenization and rapid fuel vaporization, so that more fuel can be injected in a partial quantity of the preinjection PRI or of the postinjection PI without significant wetting of the combustion chamber walls. By contrast, in the case of the injection nozzle 13 with the maximum lift setting in accordance with the left-hand side of FIG. 6, a two-phase flow 24 is produced in the interior of the nozzle hole 21 on the left-hand side, which leads to a conventional fuel breakdown. Compared to a partially open injection nozzle, the spreading angle $\alpha_2$ is smaller than the spreading angle $\alpha_1$.

A targeted setting of a desired throttling action in the seat of the nozzle needle can be assisted by a suitable measure, e.g. a 2-spring holder on the injection nozzle helping the nozzle needle to dwell at a lift position which lies between the completely open and completely closed positions. Alternatively, this setting can be realized by a nozzle needle controlled directly by a piezo-actuator.

To achieve the largest possible spreading angle $\alpha_1$ with a partially open multihole injection nozzle, the actuation should preferably take place so that the effective cross section of flow in the needle seat is preferably approximately 0.8 to 1.2 times an effective cross section of flow of the sum of all the cross sections of the injection bores.

With the abovementioned injection strategies shown in FIG. 2 to FIG. 5, it is expedient to additionally form a variable swirl, which can be switched on, in the combustion chamber 8 of the internal combustion engine 1. Thereby, a mixed cloud of a partial injection quantity is boosted both during the preinjection PRI and during the postinjection PI by a suitable swirling motion of the charge in the combustion chamber, and at the same time the jet penetration depth is reduced. The jet lobe or the mixed cloud of an injection cycle is accordingly rotated by the swirling flow to such an extent that during a subsequent injection cycle the newly formed jet lobes do not penetrate into the mixed cloud of the preceding partial injection quantity. This reduces the extent of local over-enrichment and the jet penetration depths, so that in particular fewer particulates are formed.

According to the invention, the total injection quantity of the preinjection PRI is preferably, in particular with the abovementioned injection strategies, approximately 20% to 50% of the main injection quantity in the lower part-load range, i.e. up to 70% load, and approximately 10% to 30% of the main injection quantity in the upper load range, i.e. from 70% load to full load. It is selected in such a way that knocking combustion is reliably avoided. This homogenized fuel quantity then burns approximately without any particulates or NOx, but already generates a significant proportion of the CO emissions required for the NOx reduction at the NOx storage catalytic converter and makes an important contribution to reducing the air/fuel ratio.

It is also contemplated to dispense with the prior homogeneous combustion, in particular in a rich-burn mode, and to shift the start of the main injection to an even earlier point, in a range between 20° CA and 5° CA before TDC. In this case, during the postinjection in rich-burn mode, the injection pressure of the individual partial fuel quantities is altered, because the gas density in the combustion chamber decreases continuously. Accordingly, the fuel injection pressure is reduced to a corresponding extent, likewise in steps or continuously. The total injection quantity of the main injection MI is in this case selected in such a way that in combination with the subsequently injected fuel of the postinjection PI, the torque of the conventional lean-burn mode is not exceeded or undershot. The early shift in the main injection MI is in turn limited by the maximum permissible peak pressure and the maximum permissible pressure rise in the cylinder. The torque in rich-burn mode is prevented from rising above or dropping below the value in lean-burn mode by adapting the start of injection and the injection quantity of the main injection MI.

According to the invention, the injection points and the quantitative distribution of the individual partial quantities are altered as a function of the respective compression ratio of the engine. The values given here are suitable in particular for a compression ratio of $\epsilon=16$. At higher compression ratios, the actuation duration for the injection points of the homogeneous quantity, on account of the earlier start of the ignition of the homogeneous combustion, shifts to an earlier point by the amount in degrees crank angle corresponding to a higher compression. Similarly, the start of injection of the homogeneous quantity shifts to a later point by the amount in degrees crank angle corresponding to a lower compression ratio being selected. The same also applies to differently selected intake-air temperatures. Measures which reduce the intake-air temperature allow a later start of injection of the homogeneous quantity. Measures which increase the intake-air temperature require the start of injection of the homogeneous quantity to be shifted to an earlier stage.

The invention claimed is:

1. A method for operating an internal combustion engine with compression ignition, comprising:
   injecting fuel into a combustion chamber as a plurality of fuel jets via an injection nozzle which has a nozzle needle and injection bores, such that some of the fuel is injected as a main injection and thereafter a fuel quantity is injected as a cyclical postinjection into the combustion chamber, wherein
   the cyclical postinjection partial quantities formed occurs in different magnitudes, and
   wherein a first partial quantity of fuel of the cyclical postinjection greater than a subsequent quantity of fuel of the cyclical postinjection.

2. A method for operating an internal combustion engine with compression ignition, comprising:
   injecting fuel into a combustion chamber as a plurality of fuel jets via an injection nozzle which has a nozzle needle and injection bores, such that some of the fuel is injected as a main injection and thereafter a fuel quantity is injected as a cyclical postinjection into the combustion chamber, wherein
   the cyclical postinjection partial quantities formed occurs in different magnitudes, and
   wherein the cyclical postinjection is injected at a lower injection pressure than that of the main injection.

3. The method as claimed in claim 2, wherein the main injection is begun in a range from 10° CA before top dead center to 20° CA after top dead center.

4. The method as claimed in claim 2, wherein the cyclical postinjection (PI) is begun in a range from 30° CA to 100° CA after the end of the main injection (MI).

5. The method as claimed in claim 2, wherein the cyclical postinjection occurs in two to eight cycles in an expansion stroke in a range from 20° CA to 150° CA after top dead center.

6. The method as claimed in claim 2, wherein part of the fuel is injected as a preinjection with an injection pressure which is less than or equal to that of the main injection.

7. The method as claimed in claim 2, wherein the preinjection is injected in a range from 140° CA to 60° CA before top dead center.

8. The method as claimed in claim 2, wherein the main injection is carried out in a range from 5° CA to 30° CA after an ignition point of the cyclical preinjection.

9. The method as claimed in claim 2, wherein a fuel quantity of the preinjection in a lower and medium load range is approximately 20% to 50% of a fuel quantity of the main injection and in an upper load range or full load range is approximately 10% to 30% of the fuel quantity of the main injection.

10. The method as claimed in claim 2, wherein, during at least one of the cyclical preinjection and the preinjection, a first cloud, generated during an injection cycle, of a fuel jet is offset or laterally shifted by a swirling motion formed in the combustion chamber.

11. The method as claimed in claim 2, wherein a lift of the nozzle needle is set such that a non-steady-state cavitational flow is generated in the injection bores.

12. The method as claimed in claim 2, wherein a lift of the nozzle needle is varied such that, within the injection nozzle, an effective cross section of flow between the nozzle needle and a nozzle needle seat amounts to approximately 0.8 to 1.2 times an effective cross section of flow of the sum of all the injection bores.

13. An injection nozzle for carrying out the method as claimed in 2, wherein the nozzle has an inwardly opening nozzle needle and a plurality of injection bores, and a spray hole cone angle of from 80° to 140° is settable between the injected fuel jets.

14. The injection nozzle as claimed in claim 13, wherein a lift of the nozzle needle of the injection nozzle is settable such that, within the injection nozzle, an effective cross section of flow between the nozzle needle and a needle seat amounts to approximately 0.8 to 1.2 times an effective cross section of flow of the sum of all the injection bores.

15. The injection nozzle as claimed in claim 14, wherein the lift of the nozzle needle is settable by one of a two-spring holder, a piezo-controlled nozzle needle and a coaxial variable nozzle.

16. The method as claimed in claim 2, wherein, during the cyclical postinjection, at least one of a lift of the nozzle needle and a fuel injection pressure are set such that, for each partial quantity of the cyclical postinjection, a reach of a respective fuel jet in the combustion chamber is limited to less than a distance to a combustion chamber boundary.

* * * * *